(12) United States Patent
Shinbo et al.

(10) Patent No.: US 7,382,534 B2
(45) Date of Patent: Jun. 3, 2008

(54) SCREEN AND PROJECTOR WITH SPHERICAL LENS ARRAY

(75) Inventors: Akira Shinbo, Shiojiri (JP); Shunji Kamijima, Hara-mura (JP); Kazuhisa Mizusako, Fujimi-machi (JP); Nobuo Shimizu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 371 days.

(21) Appl. No.: 11/177,418

(22) Filed: Jul. 11, 2005

(65) Prior Publication Data

US 2006/0012877 A1    Jan. 19, 2006

(30) Foreign Application Priority Data

Jul. 14, 2004   (JP) ............................. 2004-207178

(51) Int. Cl.
　　*G03B 21/60*　　(2006.01)
　　*G03B 21/56*　　(2006.01)
　　*G03B 21/14*　　(2006.01)
　　*G02F 1/135*　　(2006.01)

(52) U.S. Cl. ...................... 359/456; 359/460; 353/38; 349/30

(58) Field of Classification Search ................ 359/456, 359/443, 455, 454, 460; 353/38; 349/30
See application file for complete search history.

(56) References Cited

U.S. PATENT DOCUMENTS 4,875,064 A     10/1989  Umeda et al.
4,993,806 A      2/1991  Clausen et al.
6,317,263 B1    11/2001  Moshrefzadeh et al.
6,848,795 B2 *   2/2005  Kaminsky et al. .......... 353/120
2002/0109915 A1  8/2002  Mori et al.
2003/0072080 A1* 4/2003  Ariyoshi et al. ............ 359/487
2004/0004770 A1* 1/2004  Ebina et al. ................. 359/648
2005/0180690 A1* 8/2005  Sugiyama et al. ........... 385/33
2006/0018025 A1* 1/2006  Sharon et al. ............... 359/618

FOREIGN PATENT DOCUMENTS

EP        1 302 787 A2    4/2003

(Continued)

OTHER PUBLICATIONS

European Search Report dated Nov. 23, 2005 for corresponding European Patent Application No. EP 05 01 5103.

*Primary Examiner*—Diane I. Lee
*Assistant Examiner*—Magda Cruz
(74) *Attorney, Agent, or Firm*—Oliff & Berridge, PLC

(57) ABSTRACT

A screen includes a lens array having a plurality of spherical lens elements. A first length of the spherical lens elements, along a first direction at substantially a center of each of respective spherical lens elements, and a second length of the spherical lens elements, along a second direction at substantially the center of each of the respective lens elements and substantially orthogonal to the first direction, are set such that the second length is larger than the first length. A curvature center position of any one of the plurality of spherical lens elements is arranged to be at substantially a half of the first length along the first direction, with respect to a curvature center position of another spherical lens element adjacent to the lens element in the second direction.

8 Claims, 10 Drawing Sheets

FOREIGN PATENT DOCUMENTS

| | | |
|---|---|---|
| JP | 56-062238 | 5/1981 |
| JP | 57-172435 | 10/1982 |
| JP | 03-113434 | 5/1991 |
| JP | 09-043588 | 2/1997 |
| JP | 09043588 A * | 2/1997 |
| JP | A 2001-305315 | 10/2001 |
| JP | A 2002-357869 | 12/2002 |
| JP | 2003-502716 | 1/2003 |
| JP | A 2003-029344 | 1/2003 |
| JP | A 2004-029402 | 1/2004 |
| JP | A 2004-309733 | 11/2004 |
| JP | 2005-017919 | 1/2005 |

\* cited by examiner

SCREEN AND PROJECTOR WITH SPHERICAL LENS ARRAY

This application claims the benefit of Japanese Patent Application No. 2004-207178, filed Jul. 14, 2004. The entire disclosure of the prior application is hereby incorporated by reference herein in its entirety.

BACKGROUND

The exemplary embodiments relate to a screen and a projector, and in particular to a transmission screen that is suitable for rear projectors.

Screens, in particular, screens to project projected light from a projector are roughly classified into one of a reflection screen and a transmission screen. The reflection screen reflects projected light and scatters (diffuses) the light in directions of observers. The reflection screen is mainly used for front-type projectors. The transmission screen transmits projected light and scatters the light in directions of observers. The transmission screen is mainly used for rear projectors.

In any one of the screens, it is possible to concentrate the scattered light in, for example, a normal direction of the screen by setting a scattering angle (a diffusion angle) of the projected light to a predetermined value. Consequently, observers in front of the screen can observe a bright projected image.

In order to guide light projected on the screens in a predetermined direction, screens with structures using a lenticular lens and a micro-lens array have been proposed (see, for example, JP-A-2001-305315 and JP-A-2003-29344).

In the screen with the structure using a lenticular lens, projected light is condensed by the lenticular lens, for example, in a horizontal direction of the screen viewed from observers. In this case, the projected light is not condensed in a vertical direction orthogonal to the horizontal direction. In the screen with this structure, there is a problem in that an angular field of view, that is, a range in which a projected image can be observed is extremely narrow in the vertical direction compared with the horizontal direction.

In the screen with the structure using a micro-lens array, a plurality of micro-lens elements are arranged in an array. The respective micro-lens elements refract projected light concentrically in a normal direction of the screen with an optical axis as a center. Many of the observers are often present in the horizontal direction with respect to the screen. On the other hand, the observers are rarely present in the vertical direction of the screen. Therefore, in the screen including the micro-lens array of the related art, projected light is refracted and guided in unnecessary directions in which observers are not present. As a result, in the screen including a micro-lens array, it is difficult to guide projected light effectively only in directions in which observers are present. Thus, there is a problem in that a projected image is dark.

SUMMARY

Exemplary embodiments provide a screen that can guide projected light effectively in predetermined directions and obtain a bright projected image, and a projector including this screen.

In order to address or solve the above described problems, according to a first aspect of the exemplary embodiments, it is possible to provide a screen including a lens array having a plurality of spherical lens elements. In the screen, a first length of the plurality of spherical lens elements, along a first direction, extending substantially through centers of respective spherical lens elements, and a second length of each of the plurality of spherical lens elements, along a second direction, extending substantially through centers of respective spherical lens elements, being set such that the second length is larger than the first length, the second direction being substantially orthogonal to the first direction. In addition, a curvature center position of any one of the plurality of spherical lens elements being arranged to be positioned at substantially a half of the first length along the first direction with respect to a second curvature center position of another of the plurality of spherical lens elements, the other of the plurality of spherical lens elements being adjacent to the one of the plurality of spherical lens elements in the second direction.

A structure in which the second length is larger than the first length is equivalent to a structure in which an interval in the horizontal direction between a line connecting the centers of the lens elements in the vertical direction, and a line connecting the centers of the lens elements adjacent to the lens elements on the line, is larger than an interval between the curvature center positions of the lens elements adjacent to each other in the vertical direction. With such a structure, the screen has a wide radiation characteristic in the horizontal direction compared with the vertical direction. Consequently, the screen can effectively guide bright light of a uniform amount in the horizontal direction in which many observers are present. In addition, it is possible to arrange the lens elements efficiently by shifting the curvature center positions of the adjacent lens elements by a length substantially a half of the first length, along the first direction. Consequently, it is possible to obtain a screen that can guide projected light efficiently in predetermined directions and obtain a bright projected image.

In an exemplary embodiment, a ratio obtained by dividing the second length by the first length is 1 to 4. By setting a ratio obtained by dividing the second length w by the first length h to 1 to 4, it is possible to keep a proper balance between an angular field of view in the vertical direction and an angular field of view in the horizontal direction.

A curvature radius ratio of the lens elements is 50 to 150% when a curvature radius at a time when lens forming surfaces of the plurality of spherical lens elements are entirely covered by curvature surfaces of lenses is 100%. Consequently, it is possible to obtain satisfactory values for both an angular field of view and light utilization efficiency. Preferably, a lens occupancy ratio is 70 to 130%. Consequently, it is possible to obtain satisfactory values for both an angular field of view and light utilization efficiency.

In an exemplary embodiment, flat portions are formed near vertexes of the plurality of spherical lens elements so as to be substantially vertical to an optical axis direction. Consequently, it is possible to increase scattered light in a front direction and improve a video quality in the front direction without significantly narrowing down an angular field of vision.

In an exemplary embodiment, slopes are provided in peripheral parts of lenses of the lens elements. Consequently, it is possible to control video light to be condensed in a range of an angular field of view where frequency of presence of observers is high.

In an exemplary embodiment, a haze value of the lens elements is 0 to 90%. Consequently, it is possible to uniformalize video light.

In an exemplary embodiment, the plurality of spherical lens elements have substantially a hexagonal external appearance. It is possible to arrange the lens elements continuously in the vertical direction and the horizontal direction by forming the plurality of spherical lens elements in substantially a hexagonal shape. Consequently, it is possible to fill and arrange the plurality of spherical lens elements efficiently.

According to another aspect of the exemplary embodiment, it is possible to provide a projector including: a light source that supplies light; a spatial light modulator that modulates the light from the light source based on an image signal; a projection optical system that projects the modulated light; and the screen described above on which the projected light from the projection optical system is projected. Since the projector has the screen, it is possible to obtain a projector that can guide projected light efficiently in predetermined directions and form a bright projected image.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Exemplary embodiments of a screen and a projector including the screen according to the invention will be hereinafter explained in detail with reference to the drawings. The exemplary embodiments are not limited by the embodiments described herein.

First Exemplary Embodiment

Figure 1:
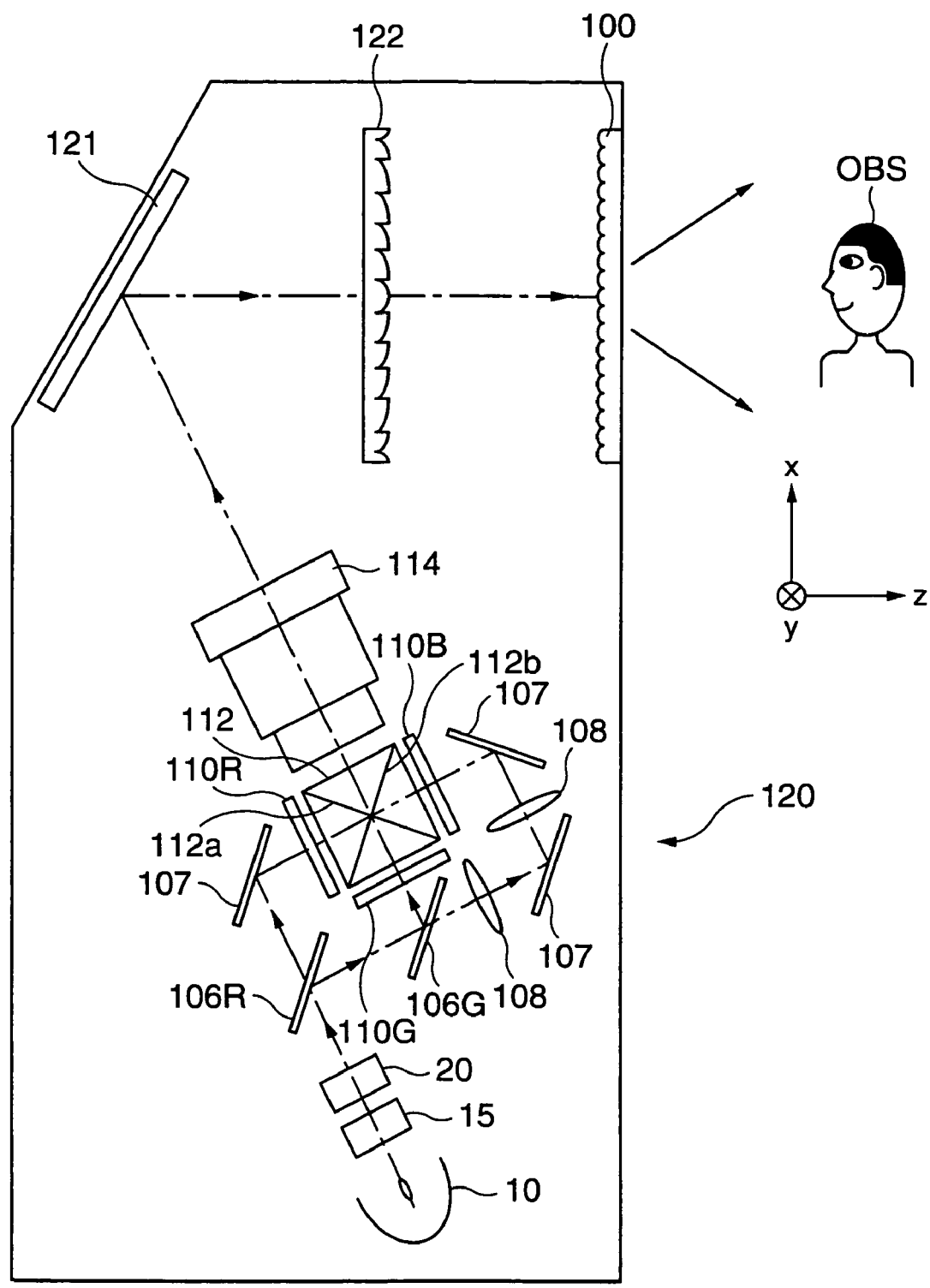
FIG. 1 is a schematic of a projector in a first exemplary embodiment.

FIG. 1 illustrates a schematic structure of a projector 120 including a transmission screen 100 according to the exemplary embodiments. The projector 120 is a rear projector and includes the transmission screen 100 which will be described below. First, the structure of the projector 120 will be explained.

An ultra-high pressure mercury lamp 10, serving as a light source, supplies light including R light that is first color light, G light that is second color light, and B light that is third color light. An integrator 15 uniformalizes an illuminance distribution of light from the ultra-high pressure mercury lamp 10. The light with the uniformalized illuminance distribution is converted into polarized light having a specific oscillating direction, for example, s-polarized light by a polarization conversion element 20. The light converted into the s-polarized light is made incident on an R light transmitting dichroic mirror 106R forming a color separation optical system. The R light will be hereinafter explained. The R light transmitting dichroic mirror 106R transmits the R light and reflects the G light and the B light. The R light transmitted through the R light transmitting dichroic mirror 106R is made incident on a reflection mirror 107. The reflection mirror 107 bends an optical path of the R light 90 degrees. The R light with the optical path bent is made incident on a spatial light modulator for first color light 110R that modulates the R light, which is the first color light, according to an image signal. The spatial light modulator for first color light 110R is a transmission liquid crystal display device that modulates the R light according to an image signal. Note that since a polarizing direction of light does not change even if the light is transmitted through a dichroic mirror, the R light made incident on the spatial light modulator for first color light 110R keeps the state of the s-polarized light.

The spatial light modulator for first color light 110R includes, in order from an incidence side, a $\lambda/2$ retardation film, a first polarizer, a liquid crystal panel, and a second polarizer. The s-polarized light made incident on the first spatial light modulator for first color light 110R is converted into a p-polarized light by the $\lambda/2$ retardation film. The R light converted into the p-polarized light is transmitted through the first polarizer directly and made incident on the liquid crystal panel. In the p-polarized light made incident on the liquid crystal panel, the R light is converted into s-polarized light according to modulation corresponding to an image signal. The R light converted into the s-polarized light according to modulation of the liquid crystal panel is emitted from the second polarizer. In this way, the R light modulated in the first spatial light modulator for first color light 110R is made incident on a cross dichroic prism 112 serving as the color combining optical system.

Next, the G light will be explained. Optical paths of the G light and the B light reflected by the R light transmitting dichroic mirror 106R are bent 90 degrees. The G light and the B light with the optical path bent are made incident on a B light transmitting dichroic mirror 106G. The B light transmitting dichroic mirror 106G reflects the G light and transmits the B light. The G light reflected by the B light transmitting dichroic mirror 106G is made incident on a spatial light modulator for second color light 110G that modulates the G light, which is the second color light, according to an image signal. The spatial light modulator for second color light 110G is a transmission liquid crystal display device that modulates the G light according to an image signal. The spatial light modulator for second color light 110G includes, in order from an incidence side, a first polarizer, a liquid crystal panel, and a second polarizer.

The G light made incident on the spatial light modulator for second color light 110G has been converted into s-polarized light. The s-polarized light made incident on the spatial light modulator for second color light 110G is transmitted through the first polarizer directly and made incident on the liquid crystal panel. In the s-polarized light made incident on the liquid crystal panel, the G light is converted into p-polarized light according to modulation corresponding to an image signal. The G light converted into the p-polarized light according to modulation of the liquid crystal panel is emitted from the second polarizer. In this way, the G light converted in the spatial light modulator for second color light 110G is made incident on the cross dichroic prism 112 serving as the color combining optical system.

Next, the B light will be explained. The B light transmitted through the B light transmitting dichroic mirror 106G is made incident on a spatial light modulator for third color light 110B that modulates the B light, which is the third color light, according to an image signal through two relay lenses 108 and two reflection mirrors 107. The spatial light modulator for third color light 110B is a transmission liquid crystal display device that modulates the B light according to an image signal.

Note that the B light is made incident on the spatial light modulator for third color light 110B through the relay lenses 108 because a length of an optical path of the B light is larger than lengths of optical paths of the R light and the G light. By using the relay lenses 108, it is possible to guide the B light transmitted through the B light transmitting dichroic mirror 106G to the spatial light modulator for third color light 110B directly. The spatial light modulator for third color light 110B includes, in order from an incidence side, a λ/2 retardation film, a first polarizer, a liquid crystal panel, and a second polarizer. Note that, since a structure of the spatial light modulator for third color light 110B is the same as the structure of the spatial light modulator for first color light 110R, a detailed explanation of the structure is omitted.

The B light made incident on the spatial light modulator for third color light 110B has been converted into s-polarized light. The s-polarized light made incident on the spatial light modulator for third color light 110B is converted into p-polarized light by the λ/2 retardation film. The B light converted into the p-polarized light is transmitted through the first polarizer directly and made incident on the liquid crystal panel. In the p-polarized light made incident on the liquid crystal panel, the B light is converted into s-polarized light according to modulation corresponding to an image signal. The B light converted into the s-polarized light according to modulation of the liquid crystal panel is emitted from the second polarizer. The B light modulated in the spatial light modulator for third color light is made incident on the cross dichroic prism 112 serving as the light combining system. In this way, the R light transmitting dichroic mirror 106R and the B light transmitting dichroic mirror 106G, which form the color separation optical system, separate light supplied from the ultra-high pressure mercury lamp 10 into the R light that is the first color light, the G light that is the second color light, and the B light that is the third color light.

The cross dichroic prism 112 serving as the color combining optical system includes two dichroic films 112a and 112b arranged orthogonally in an X shape. The dichroic film 112a reflects the B light and transmits the G light. The dichroic film 112b reflects the R light and transmits the G light. In this way, the cross dichroic prism 112 combines the R light, the G light, and the B light that are modulated by the spatial light modulator for first color light 110R, the spatial light modulator for second color light 110G, and the spatial light modulator for third color light 110B, respectively. A projection lens 114 projects light combined by the cross dichroic prism 112 on the screen 100.

Note that, as described above, light made incident on the cross dichroic prism 112 from the spatial light modulator for the first color light 110R and the spatial light modulator for the third light 110B is set to s-polarized light. Light made incident on the cross dichroic prism 112 from the spatial light modulator for second color light 110G is set to be p-polarized light. A polarization direction of light made incident on the cross dichroic prism 112 is varied in this way. This is for the purpose of effectively combining lights, which are emitted from the respective spatial light modulators, in the cross dichroic prism 112. Usually, the dichroic films 112a and 112b are excellent in a reflection characteristic for s-polarized light. Therefore, the R light and the B light, which should be reflected on the dichroic films 112a and 112b, are set as s-polarized lights, and the G light, which should be transmitted through the dichroic films 112a and 112b, is set as p-polarized light.

The light subjected to color synthesis is made incident on the projection lens 114. The projection lens 114 has a function of magnifying the light subjected to color synthesis and projecting the light on the screen 100. An optical path of the light from the projection lens 114 is changed to the horizontal direction in FIG. 1 by a reflection mirror 121. The light with the optical path changed is made incident on a Fresnel lens 122. The Fresnel lens 122 converts the incident light into substantially parallel beams and emits the light. The light converted into the substantially parallel beams is made incident on the screen 100.

Figure 2A:
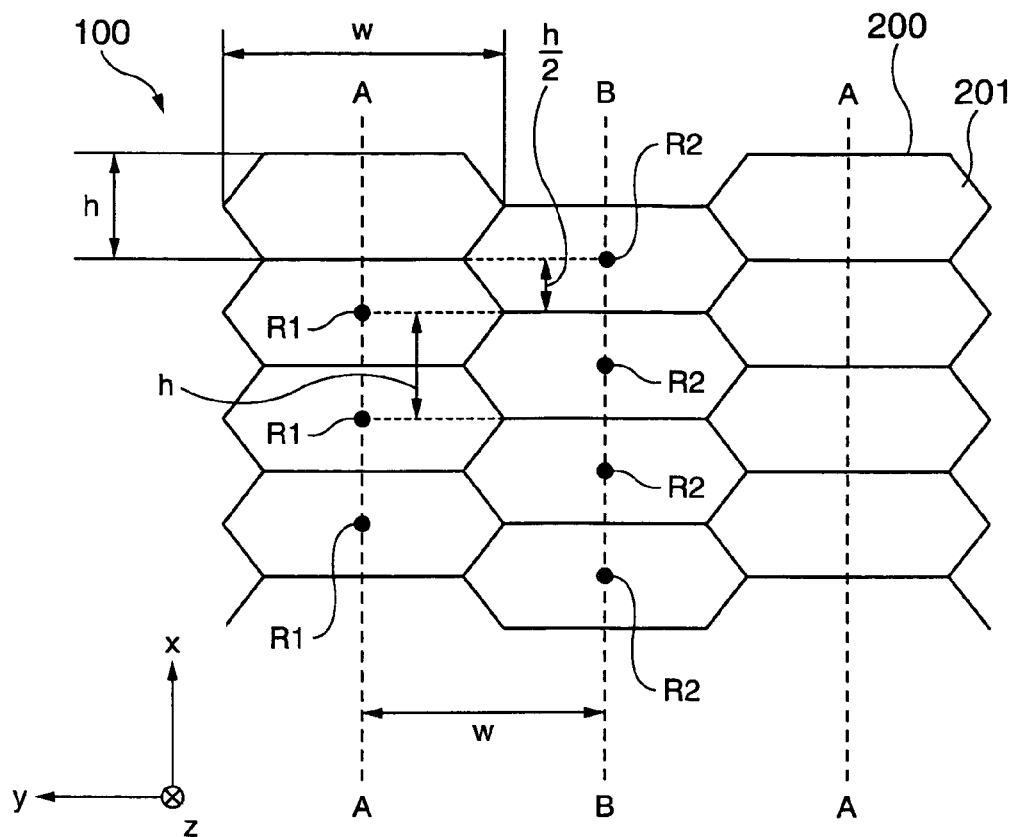
FIG. 2A is a front schematic of a screen in an exemplary embodiment.
Figure 2B:
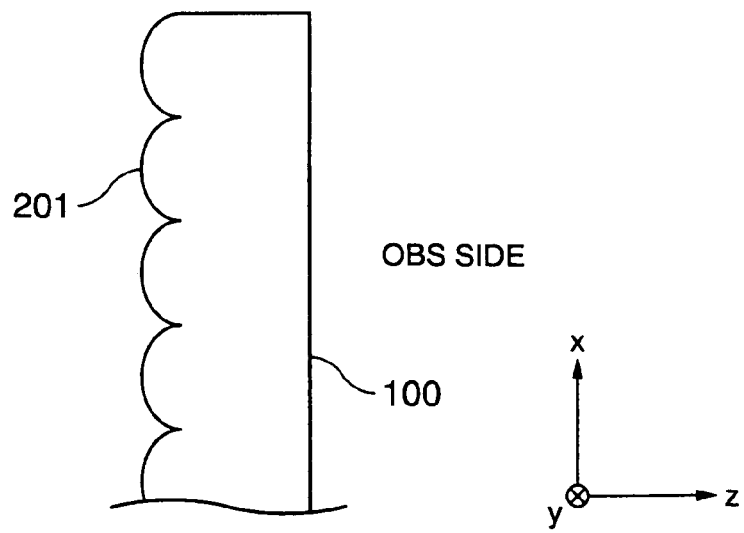
FIG. 2B is a sectional view of the screen of FIG. 2A.

FIG. 2A illustrates a structure of the screen 100 viewed from a side where a lens 201 is formed. FIG. 2B illustrates a structure along a section A-A. The screen 100 includes a micro-lens array consisting of a plurality of lens elements 200. The lens 201 is a spherical lens having a predetermined curvature radius. Here, when observers OBS observe the projector 120, it is assumed that a first direction is a vertical direction (an x-axis direction) and a second direction is a horizontal direction (a y-axis direction). In this case, a first length h along the vertical direction at substantially a center of the respective lens elements 200 and a second length w along the horizontal direction at substantially the center of the respective lens elements 200 are set such that the second length w is larger than the first length h. A curvature center position R1 of at least one of the plurality of lens elements 200 is arranged to be at substantially a half of the first length h (=h/2) along the vertical direction with respect to a curvature center position R2 of another of the plurality of lens elements 200, adjacent to the one of the plurality of lens elements in the horizontal direction.

A structure in which the second length w is larger than the first length h, is equivalent to a structure in which an interval w, in the horizontal direction, between a line A-A connecting the centers of the lens elements in the vertical direction, and a line B-B adjacent to the line A-A, is larger than an interval h, between the curvature center positions R1 of the lens elements adjacent to each other in the vertical direction. With such a structure, the screen 100 has a wide radiation characteristic in the horizontal direction compared with the vertical direction. Consequently, the screen 100 can effectively guide a uniform amount of bright light in the horizontal direction in which many observers OBS are present.

The lens elements 200 are substantially hexagonal and are arranged continuously in the vertical direction and the horizontal direction. The lens elements 200 in adjacent columns are arranged to be shifted by half a pitch. Here, the first length h is set as one pitch. For example, in FIG. 2A, in columns indicated by the lines A-A and a column indicted by the line B-B between these columns, the respective lens elements 200 are arranged to be shifted by half a pitch, that is, h/2. Consequently, it is possible to efficiently arrange the lens elements 200.

Figure 3:
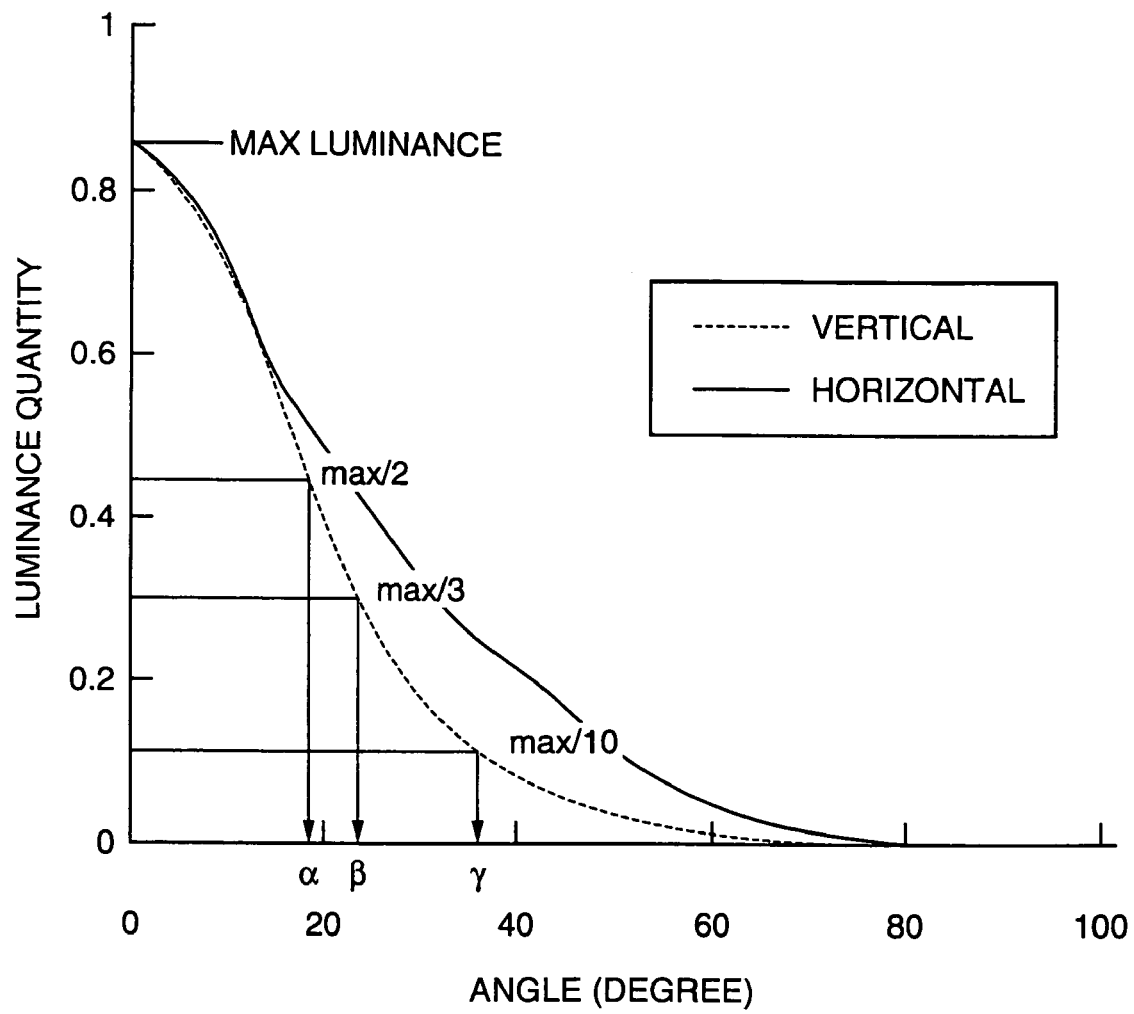
FIG. 3 is a schematic of an angular field of view index in an exemplary embodiment.

It is desirable that, in the lens elements 200, a ratio obtained by dividing the second length w by the first length h is 1 to 4. Here, an angular field of view index will be explained with reference to FIG. 3. A vertical axis and a horizontal axis of FIG. 3 indicate an arbitrary luminance quantity and an angle with respect to a normal (0 degree in the front) of the screen 100, respectively. A solid line indicates an angular field of view distribution in the horizontal direction and a broken line indicates an angular field of view in the vertical direction. A peak luminance of light traveling in a normal direction of the screen is set as a reference intensity. A maximum angle, at which light of half the reference intensity is irradiated, is set as an angular field of view index $\alpha$. Similarly, a maximum angle, at which light of one third of the reference intensity is irradiated, is set as an angular field of view index $\beta$ and a maximum angle, at which light of one tens of the reference intensity is irradiated, is set as an angular field of view index $\gamma$.

Figure 4:
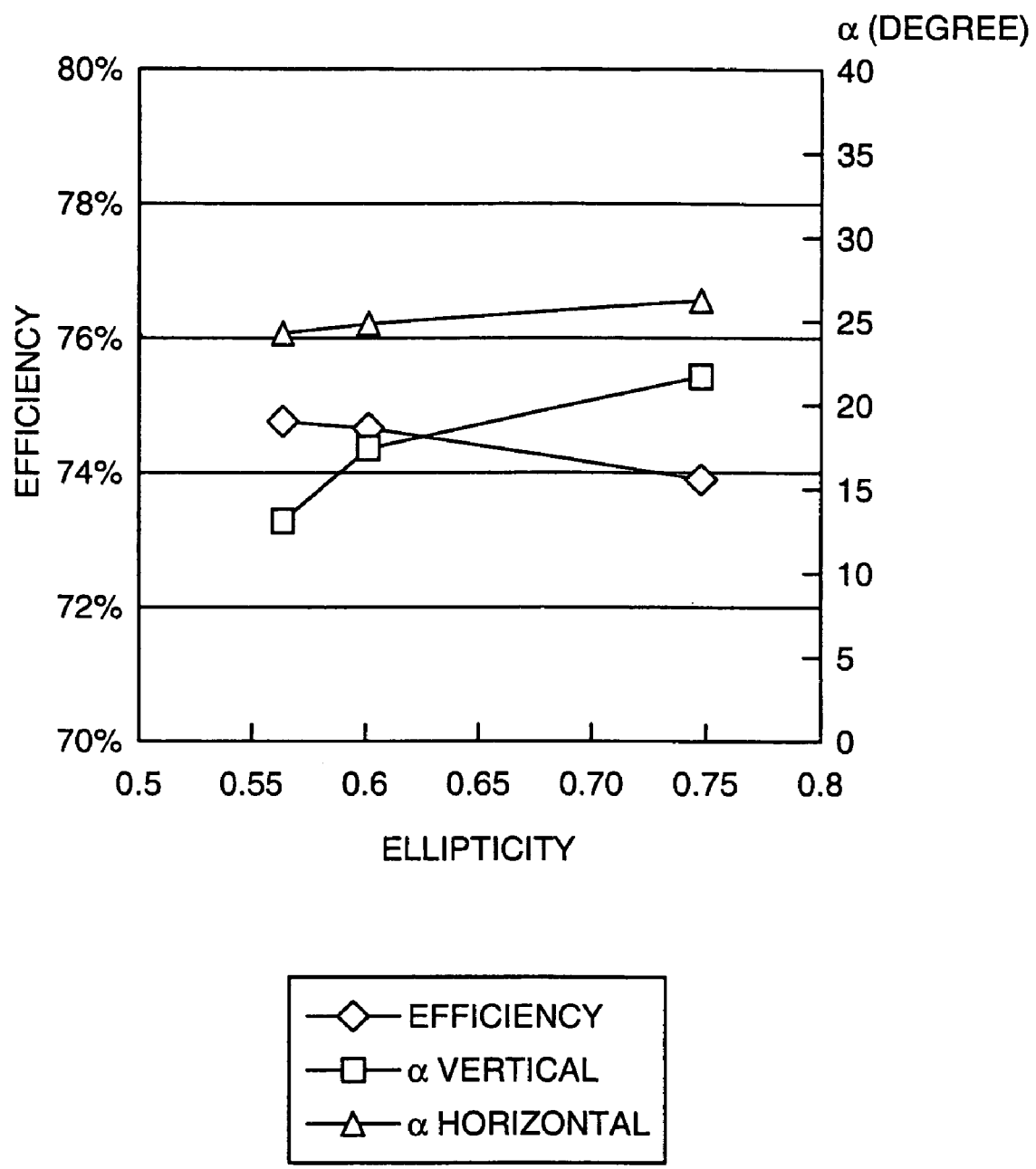
FIG. 4 is a chart of ellipicity versus efficiency in an exemplary embodiment.

An inverse of the ratio obtained by dividing the second length w by the first length h is defined as an ellipicity. FIG. 4 illustrates both the angular field of view $\alpha$ and light utilization efficiency at the time when a ratio of the first length h and the second length w is changed. According to an increase in the ratio in the vertical direction, an angular field of view in the vertical direction increases, but the light utilization efficiency decreases. In this way, it is possible to adjust radiation characteristics (scattering degrees) in the vertical direction and the horizontal direction of video light according to the ratio of the vertical direction and the horizontal direction of the lens elements 200, that is, the ellipicity. As described above, it is possible to keep a proper balance between an angular field of view in the vertical direction and an angular field of view in the horizontal direction by setting the ratio obtained by dividing the second length w by the first length h to 1 to 4. More preferably, as conditions of the screen 100, in an exemplary embodiment, it is desirable that utilization efficiency of the video light is 73% or more and the angular field of view in the vertical direction $\alpha$ is 12 degrees or more.

Next, a lens occupancy ratio and a screen characteristic will be explained. In a relation between a curvature radius R and a lens pitch of the lenses 201, when the curvature radius R is changed, the lenses 201 overlap each other, the entire surface of the lenses 201 are covered by a micro-lens array, and a lens occupancy ratio is defined as 100%. In other words, in a state in which the lens occupancy ratio is 100%, there is no flat portion on the lens elements 200. With the curvature radius at this point as a reference, a lens occupancy ratio is defined according to a curvature radius ratio at the time when the curvature radius R is changed.

Figure 5A:
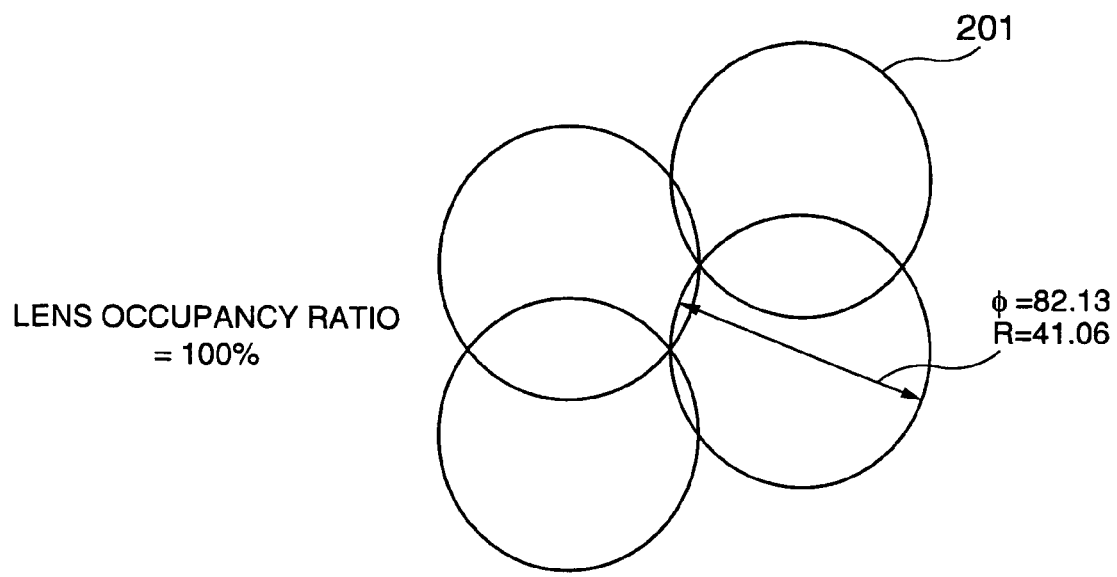
FIG. 5A is a schematic of a lens occupancy ratio in an exemplary embodiment.
Figure 5B:
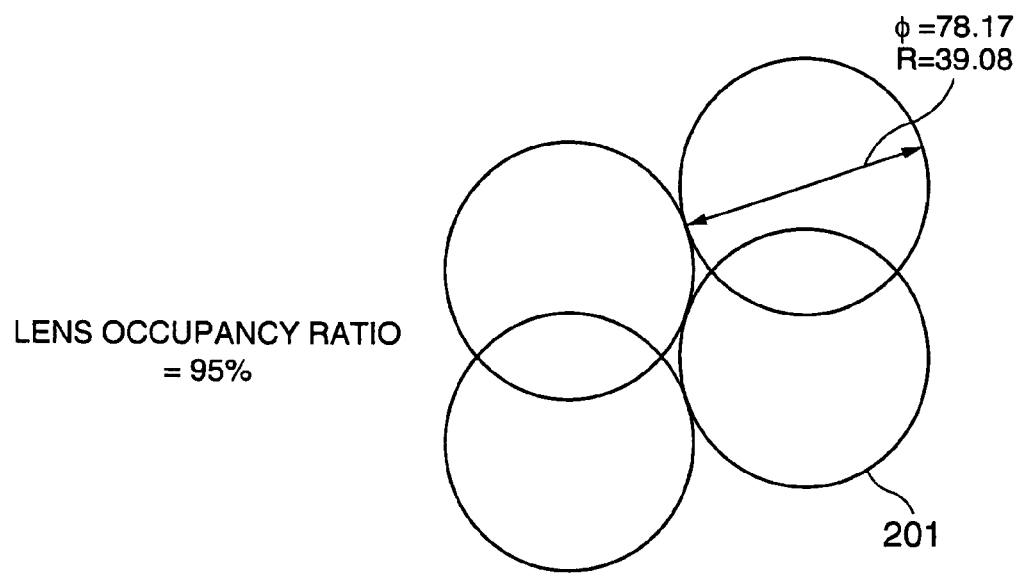
FIG. 5B is another schematic of a lens occupancy ratio in an exemplary embodiment.
Figure 5C:
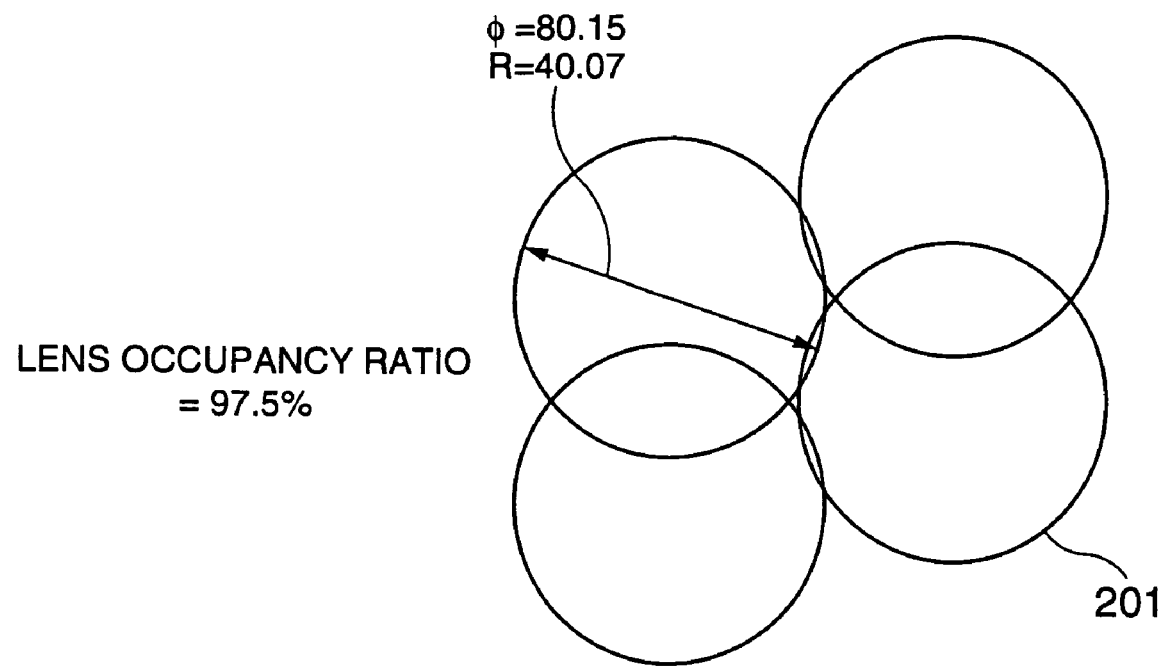
FIG. 5C is another schematic of a lens occupancy ratio in an exemplary embodiment.

FIGS. 5A, 5B, and 5C illustrates examples of the curvature radius R and a lens diameter $\phi$ when the lens occupancy ratios are 100%, 95%, and 97.5%, respectively. Both the curvature radius R and the lens diameter $\phi$ are indicated by a unit of micrometer. When the lens occupancy ratio is 100%, the curvature radius R of the lens elements 200 is 41.06 and the lens diameter $\phi$ thereof is 82.13. When the lens occupancy ratio is 95%, the curvature radius R of the lens elements 200 is 39.08 and the lens diameter $\phi$ thereof is 78.17. When the lens occupancy ratio is 97.5%, the curvature radius R of the lens elements 200 is 40.07 and the lens diameter $\phi$ thereof is 80.15.

Figure 6:
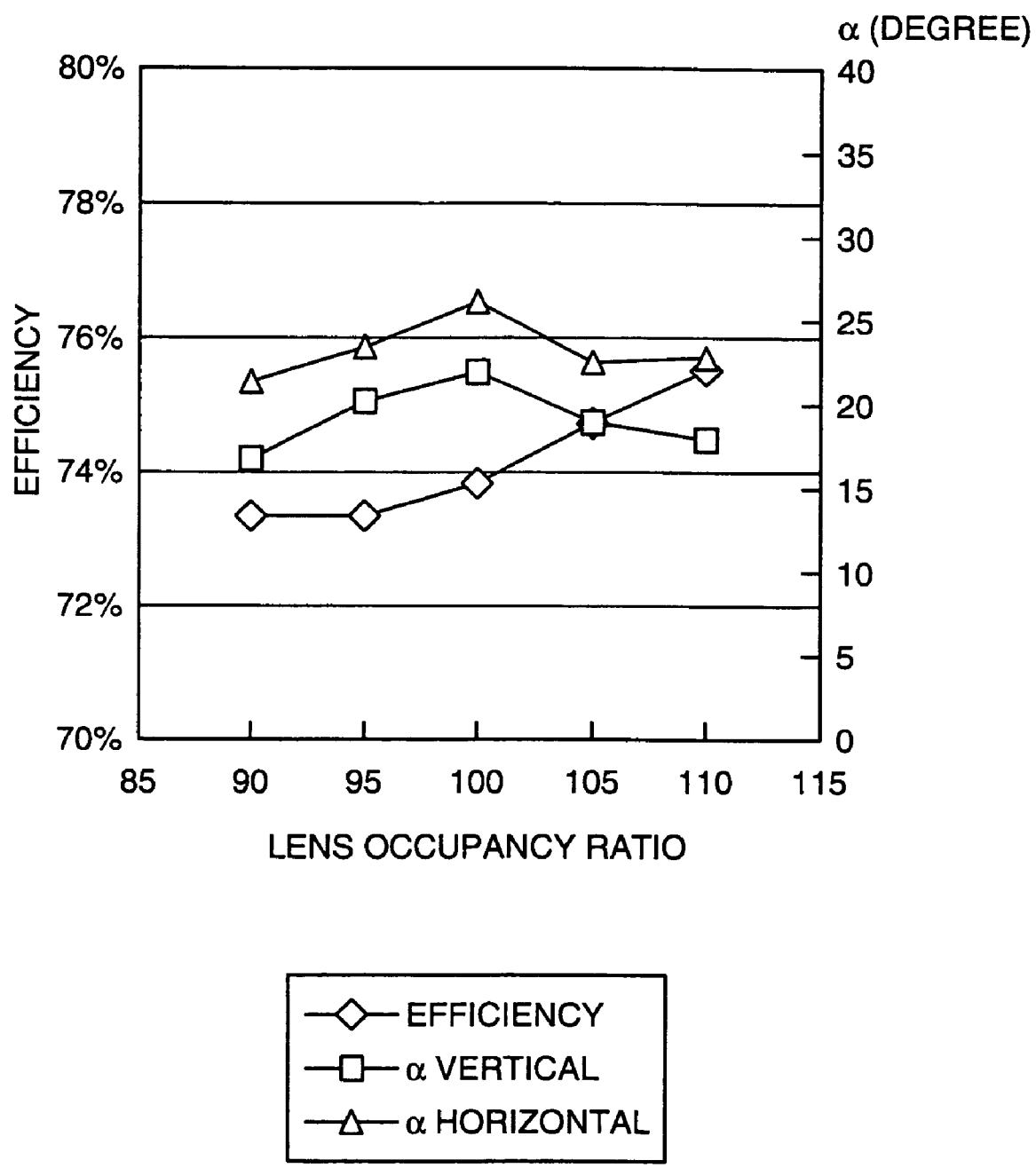
FIG. 6 is a chart of lens occupancy ratio versus efficiency in an exemplary embodiment.

In an exemplary embodiment, assuming that a curvature radius at the time when lens forming surfaces of the lens elements 200 are entirely covered by curvature surfaces of the lenses 201 is 100%, it is desirable that a curvature radius ratio of the lenses 201 is 50 to 150%. FIG. 6 illustrates a relation between a lens occupancy and an angular field of view characteristic. As it is evident from FIG. 6, the angular field of view characteristic has a maximum near the lens occupancy ratio of 100%. It is desirable that the lens occupancy is 50 to 150% and, more preferably, 70 to 130%. Consequently, it is possible to obtain satisfactory values for both the angular field of view and the light utilization efficiency. Note that, in this exemplary embodiment, an external shape of the lens elements 200 is hexagonal as described above. If the lens occupancy ratio is changed, an amount of overlap of the adjacent lens elements 200 changes. Therefore, an external shape of lens elements can take various shapes such as circular, substantially octagonal, and rectangular according to the lens occupancy ratio.

Second Exemplary Embodiment

Figure 7:
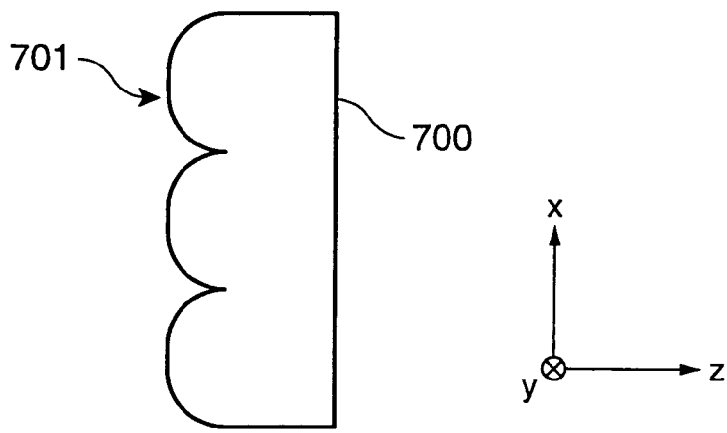
FIG. 7 is a sectional schematic of a screen in a second exemplary embodiment.
Figure 8:
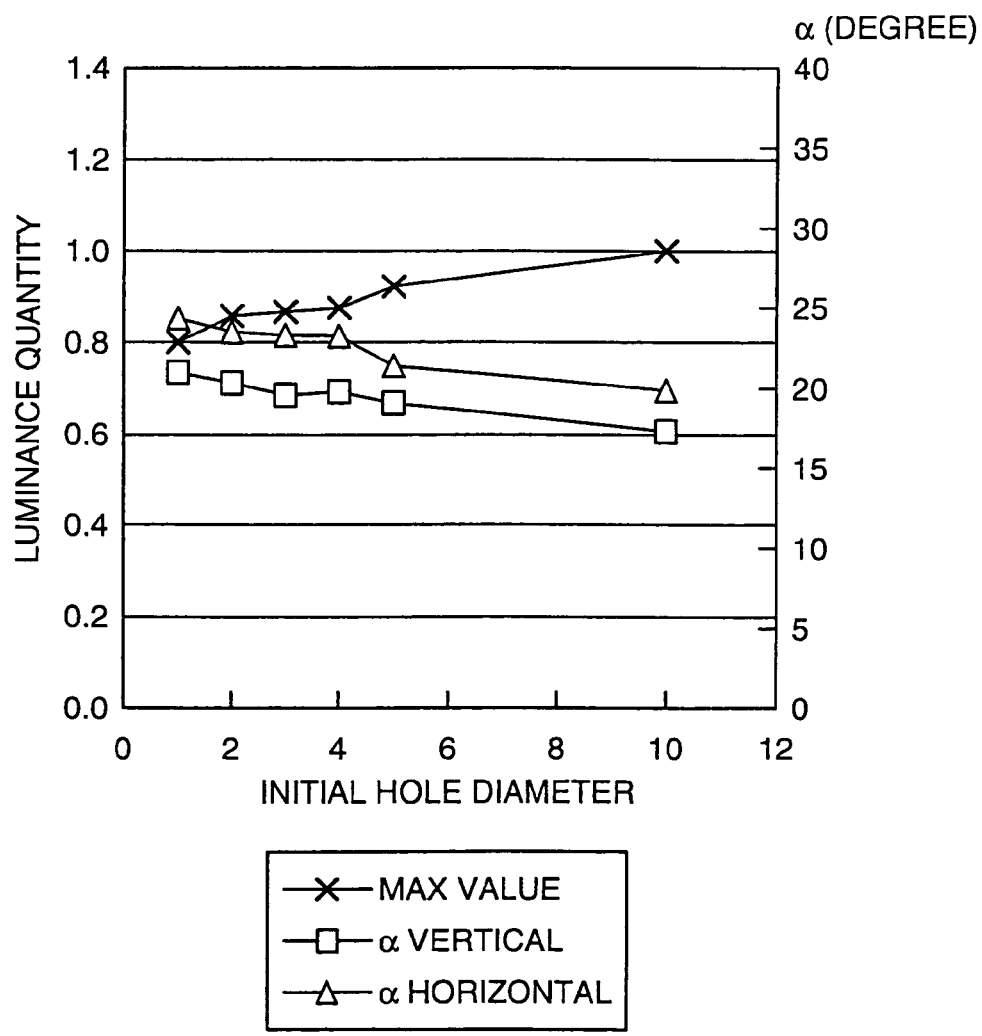
FIG. 8 is a chart of initial hole diameter versus efficiency in an exemplary embodiment.

FIG. 7 illustrates a sectional structure of a screen 700 according to a second exemplary embodiment of the invention. Flat portions 701 are formed to be substantially perpendicular to a z-axis direction, which is an optical axis, near vertexes of lens elements. FIG. 8 illustrates a relation between a size (i.e., an initial hole diameter indicated by a horizontal axis) of the flat portions 701 and an angular field of vision characteristic. It is desirable that the size of the flat portions 701 is about 1 to 20% and, more preferably, about 3 to 10% of a lens diameter of respective lens elements. Consequently, it is possible to increase scattered light in a front direction and improve a video quality in the front direction without significantly narrowing down an angular field of view.

Figure 9:
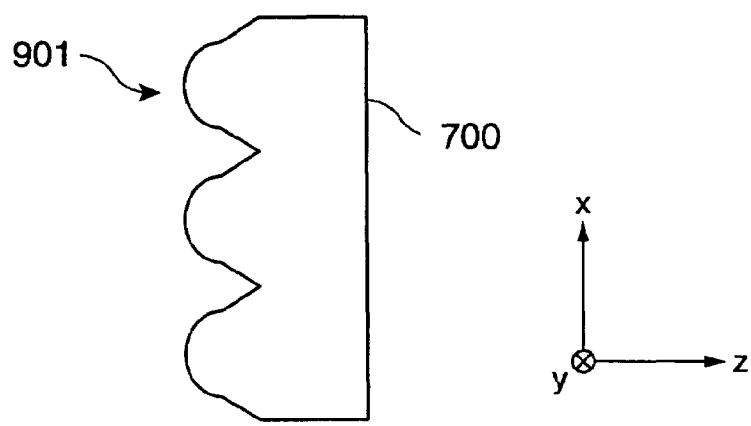
FIG. 9 is a sectional schematic of another screen in the second exemplary embodiment.
Figure 10:
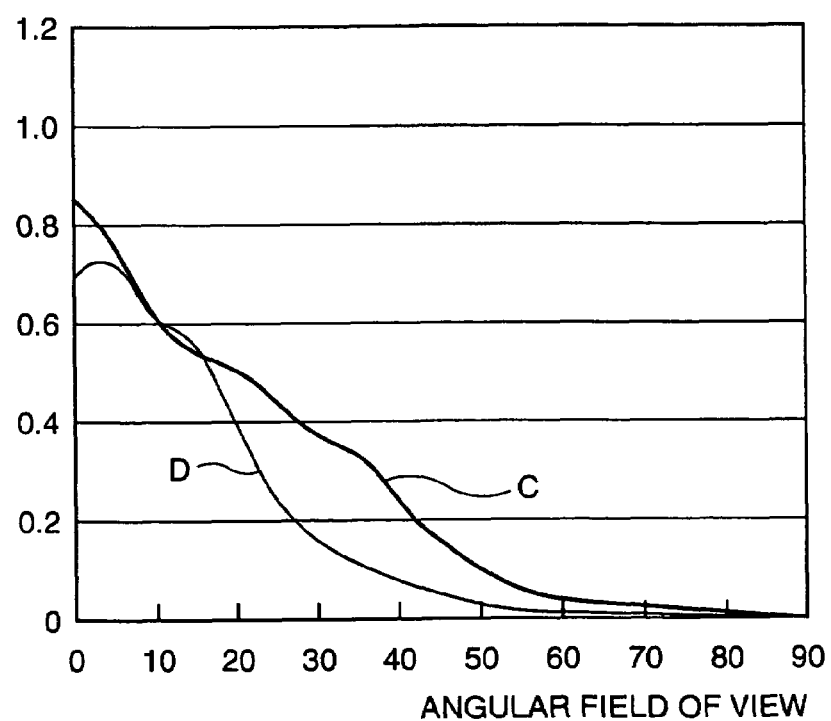
FIG. 10 is a chart of slope versus efficiency in an exemplary embodiment.

As illustrated in FIG. 9, slopes 901 may be formed in peripheral parts of lenses of lens elements. As illustrated in FIG. 10, compared with when the slopes 901 are not provided as indicated by a curve D, a light utilization ratio is improved when the slopes 901 are provided, as indicated by a curve C. Therefore, by forming the slopes 901 in peripheral parts of lens elements, it is possible to control video light to be condensed in a range of an angular field of view where frequency of presence of the observers OBS is high.

Figure 11:
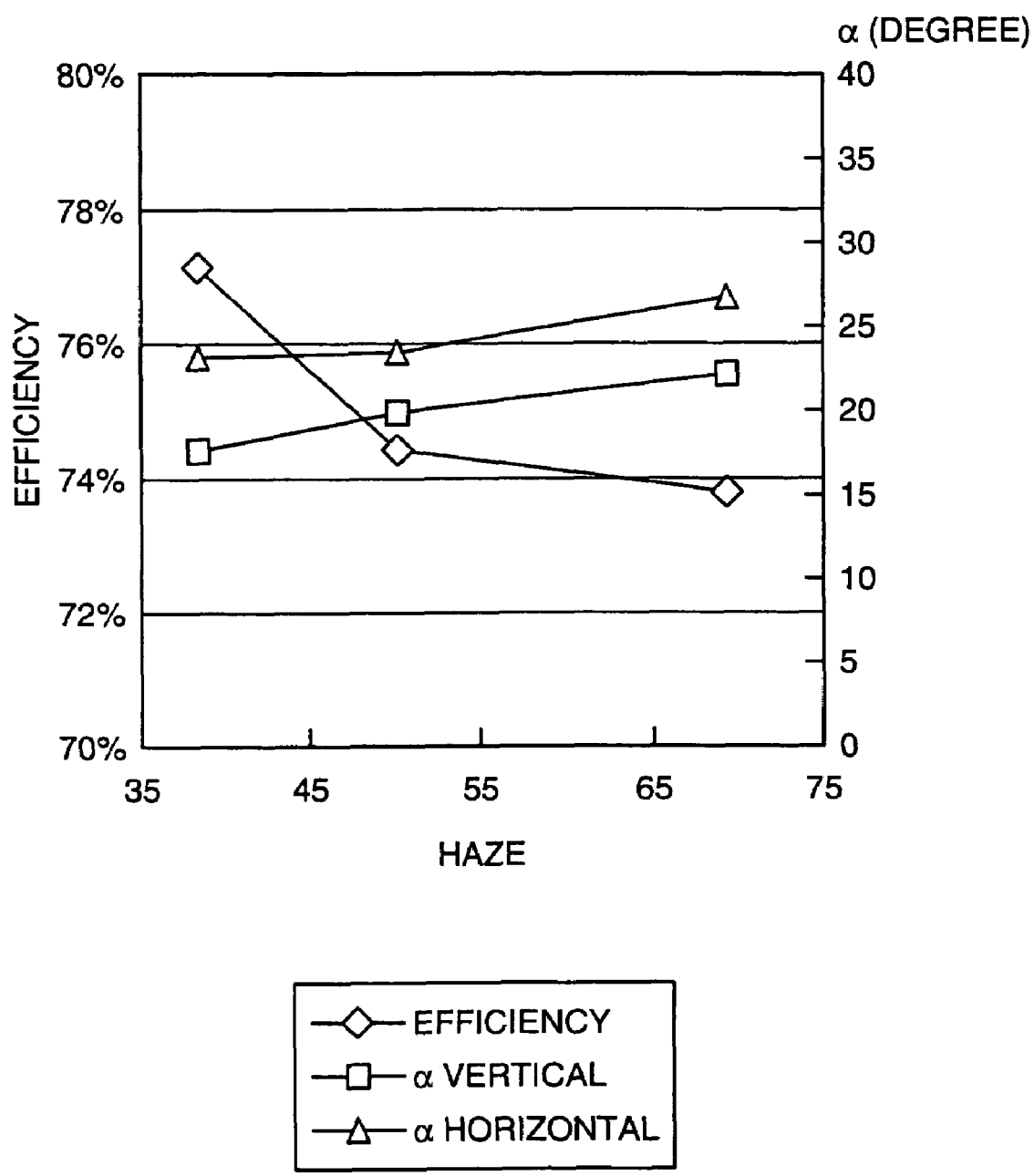
FIG. 11 is a chart of haze value versus efficiency in an exemplary embodiment.

It is desirable to set a haze value of the lens elements is 0 to 90%. FIG. 11 illustrates a relation among a haze value, efficiency, and an angular field of view. The haze value is defined as 0% when incident light is transmitted directly, and as 100% when incident light is scattered entirely. It is possible to control the haze value by roughening lens surfaces or mixing a scattering agent in the lens elements. Consequently, it is possible to uniformalize video light.

The screen of the exemplary embodiments can be manufactured according to a manufacturing method described below. A mold of a desired shape is formed by machining. A mask is formed by a method of transferring the shape to a resin material, a sputtering method, an evaporation method, a CVD, or the like. A resist film is formed on a synthetic quartz substrate by a spin coat method or a spray coat method, and, then, a mask opening is formed by a photolithography technique. After the mask opening is provided, the substrate is immersed in a fluorine solution and the substrate is etched by isotropic etching from the mask opening to form a lens shape. A replica is formed using this glass substrate as a mold.

As explained above, it is possible to irradiate a predetermined amount of light in necessary directions, at high light utilization efficiency, and obtain a bright and uniform video in a predetermined area, by changing sizes in the vertical and horizontal direction of lens elements and a lens occupancy ratio, and controlling radiation angles in the vertical and horizontal directions of a screen. In addition, a light-emitting diode may be used as a light source of a projector. Moreover, lens surfaces may be formed on an observer side of the screen.

As described above, the screen according to the exemplary embodiments is suitable for projectors, and in particular for rear projectors including a transmission screen.

What is claimed is:

1. A screen, comprising:
   a lens array having a plurality of spherical lens elements,
   a vertical length of each of the plurality of spherical lens elements, along a vertical direction, extending substantially through centers of respective spherical lens elements, and a horizontal length of each of the plurality of spherical lens elements, along a horizontal direction, extending substantially through centers of respective spherical lens elements, being set such that the horizontal length is larger than the vertical length, the horizontal direction being substantially orthogonal to the vertical direction; and
   a curvature center position of any one of the plurality of spherical lens elements being arranged to be positioned at substantially a half of the first length along the first direction with respect to a second curvature center position of an other of the plurality of spherical lens elements, the other of the plurality of spherical lens elements being adjacent to the one of the plurality of spherical lens elements in the second direction.

2. The screen according to claim 1, a ratio obtained by dividing the second length by the first length being 1 to 4.

3. The screen according to claim 1, a curvature radius ratio of the lens elements being 50 to 150% when a curvature radius at a time when lens forming surfaces of the plurality of spherical lens elements are entirely covered by curvature surfaces of lenses is 100%.

4. The screen according to claim 1, further comprising:
   flat portions formed near vertexes of the lens elements so as to be substantially vertical to an optical axis direction.

5. The screen according to claim 1, the plurality of spherical lens elements having slopes provided in peripheral parts of the lenses.

6. The screen according to claim 1, a haze value of the plurality of spherical lens elements being 0 to 90%.

7. The screen according to claim 1, the plurality of spherical lens elements having substantially a hexagonal external appearance.

8. A projector, comprising:
   a light source that supplies light;
   a spatial light modulator that modulates the light from the light source based on an image signal;
   a projection optical system that projects the modulated light; and
   the screen according to claim 1, on which the projected light from the projection optical system is projected.

* * * * *